US010606837B2

(12) United States Patent
Dickie et al.

(10) Patent No.: US 10,606,837 B2
(45) Date of Patent: *Mar. 31, 2020

(54) PARTITIONED JOIN WITH DENSE INNER TABLE REPRESENTATION

(71) Applicant: INTERNATIONAL BUSINESS MACHINES CORP., Armonk, NY (US)

(72) Inventors: Garth A. Dickie, Framingham, MA (US); Ian R. Finlay, Ontario (CA)

(73) Assignee: International Business Machines Corporation, Armonk, NY (US)

(*) Notice: Subject to any disclaimer, the term of this patent is extended or adjusted under 35 U.S.C. 154(b) by 994 days.

This patent is subject to a terminal disclaimer.

(21) Appl. No.: 15/152,675

(22) Filed: May 12, 2016

(65) Prior Publication Data

US 2016/0371337 A1 Dec. 22, 2016

Related U.S. Application Data

(63) Continuation of application No. 14/743,225, filed on Jun. 18, 2015, now Pat. No. 9,953,057.

(51) Int. Cl.
*G06F 16/2455* (2019.01)
*G06F 16/22* (2019.01)

(52) U.S. Cl.
CPC ...... *G06F 16/2456* (2019.01); *G06F 16/2255* (2019.01); *G06F 16/24554* (2019.01)

(58) Field of Classification Search
CPC ............... G06F 16/316; G06F 16/2282; G06F 16/24554; G06F 16/2456
See application file for complete search history.

(56) References Cited

U.S. PATENT DOCUMENTS

| 5,884,320 | A | 3/1999 | Agrawal et al. |
| 6,609,131 | B1 | 8/2003 | Zait et al. |
| 7,895,191 | B2 | 2/2011 | Colossi et al. |
| 8,275,761 | B2 | 9/2012 | Day |
| 2009/0119247 | A1 | 5/2009 | Bellamkonda |
| 2012/0124045 | A1* | 5/2012 | Pendap ............. G06F 16/24554 707/737 |
| 2012/0296913 | A1* | 11/2012 | Ash ....................... G06F 16/316 707/741 |

(Continued)

OTHER PUBLICATIONS

Jun. 18, 2015, U.S. Appl. No. 14/743,225.

(Continued)

*Primary Examiner* — Etienne P Leroux
(74) *Attorney, Agent, or Firm* — Richard Wilhelm; SVL IPLaw Edell

(57) ABSTRACT

To perform a join operation on database objects, data structures contained in a first database object are distributed across database partitions in accordance with a partitioning scheme. Data structures of the first database object are associated with respective indices computed complementarily to the partitioning scheme. Other indices are computed from the respective data structures of a second database object. The join operation is performed at each of the database partitions on the data structures in the respective first and second database objects having the indices and the other indices in common.

8 Claims, 7 Drawing Sheets

(56) References Cited

U.S. PATENT DOCUMENTS

2012/0323929 A1* 12/2012 Kimura .............. G06F 16/2282
707/748
2014/0181076 A1 6/2014 Au et al.
2014/0280021 A1* 9/2014 Singamshetty ......... G06F 1/035
707/714

OTHER PUBLICATIONS

IBM, "Method and system assigning clustered data to database partitions without data redistribution", An IP.com Prior Art Database Technical Disclosure, IPCOM000186372, Aug. 17, 2009, 5 pages.
ip.com, "Self-Join Optimizations", An IP.com Prior Art Database Technical Disclosure, IPCOM000205258, Mar. 22, 2011, 7 pages.
ip.com, "A Method to Optimize Join Performance Between Relational Database Tables and External Unstructured Data", An IP.com Prior Art Database Technical Disclosure, IPCOM000236429, Apr. 25, 2014, 7 pages.
Dobos et al., "SkyQuery: An Implementation of a Parallel Probabilistic Join Engine for Cross-Identification of Multiple Astronomical Databases", Jun. 21, 2012, 18 pages.
List of IBM Patents or Patent Applications Treated As Related, May 12, 2016, 1 page.

* cited by examiner

| K: | 0 | 1 | 2 | 3 | 4 | 5 | 6 | 7 | 8 | 9 | 10 | 11 | 12 | 13 | 14 | 15 | 16 | 17 | 18 | ... |
| H: | 0 | 1 | 2 | 0 | 1 | 2 | 0 | 1 | 2 | 0 | 1 | 2 | 0 | 1 | 2 | 0 | 1 | 2 | 0 | ... |
| I: | 0 | 0 | 0 | 1 | 1 | 1 | 2 | 2 | 2 | 3 | 3 | 3 | 4 | 4 | 4 | 5 | 5 | 5 | 6 | ... |

{ SECTION 610 }

PARTITIONED JOIN WITH DENSE INNER TABLE REPRESENTATION

CROSS-REFERENCE TO RELATED APPLICATIONS

This application is a continuation of U.S. patent application Ser. No. 14/743,225, entitled "Partitioned Join With Dense Inner Table Representation" and filed Jun. 18, 2015, the disclosure of which is incorporated herein by reference in its entirety.

BACKGROUND

Present invention embodiments relate to improving efficiency in executing database operations, and more specifically, to improving efficiency of join operations on objects contained in a distributed database.

In a data warehouse, the largest consumers of processing resources are GROUP BY and JOIN database operations. For distributed databases typically implemented in data warehouses, each partition of the distributed database performs a hash join, which has several associated costs. First, hash tables are often sparse, which wastes RAM (random access memory). Additionally, hashing does not always produce unique (one-to-one) values, so the hash table must store key values in a manner by which collisions can be detected and/or avoided. Hash probing is also computationally expensive; it typically involves hash computation, random memory access even when the keys being probed are otherwise correlated, and key verification.

Performing JOIN operations on a primary key or other uniquely-valued column can be made more efficient by using direct lookup associative arrays where each key is associated with an index. Such an arrangement is very efficient when the join key values are dense or almost-dense. However, in distributed databases, each database partition may have only a sparse subset of the join keys thus defeating potential efficiency improvements of a direct lookup arrangement. Thus, ongoing research and development efforts seek to optimize JOIN performance in partitioned database implementations.

SUMMARY

To perform a join operation on database objects, data structures contained in a first database object are distributed across database partitions in accordance with a partitioning scheme. Data structures of the first database object are associated with indices computed complementarily to the partitioning scheme. Other indices are also computed from the respective data structures of a second database object. The join operation is performed at each of the database partitions on the data structures in the respective first and second database objects having the indices and the other indices in common.

BRIEF DESCRIPTION OF THE DRAWINGS

Generally, like reference numerals in the various figures are utilized to designate like components.

FIG. 6 is a diagram illustrating data indexing utilized in simple partitioning embodiments of the present invention.

DETAILED DESCRIPTION

Figure 1:
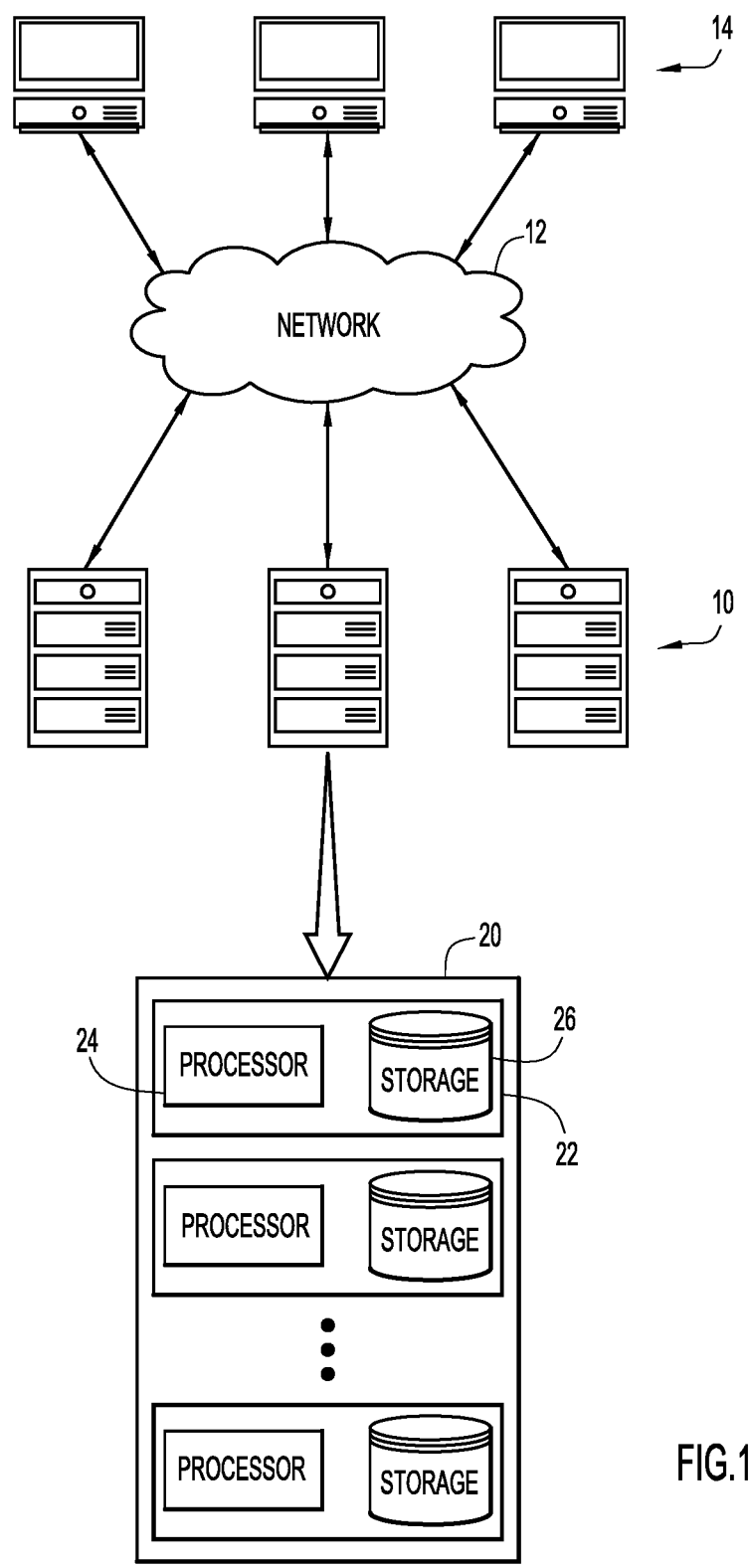
FIG. 1 is a schematic block diagram of a processing environment for an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. Network 12 may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to, among other things, submit data to server systems 10 at which the data may be processed, analyzed and/or stored in a database (described below). Client systems 14 may also allow users to construct query statements and execute queries on the database, as is described in more detail below. Server systems 10 may include one or more node processors 22, each comprising a processor 24 and data storage 26, from which a massively-parallel processing (MPP) system 20 may be constructed. Embodiments of the invention utilize computational and storage resources on MPP system 20 to construct, among other things, a distributed database.

Server systems 10 and client systems 14 may be implemented by any conventional or other computer systems preferably equipped with a display or monitor, a base (e.g., including at least one processor, one or more memories and/or internal or external network interfaces or communications devices (e.g., modem, network cards, etc.)), optional input devices (e.g., a keyboard, mouse or other input device), and any commercially available and custom software (e.g., server/communications software, distributed database management module, browser/interface software, etc.). A graphical user (e.g., GUI, etc.) or other interface (e.g., command line prompts, menu screens, etc.) may be implemented to solicit information (e.g., database query statements, etc.) from a corresponding user pertaining to the desired database(s) and analysis, and may provide reports including, among other things, analysis results.

Figure 2:
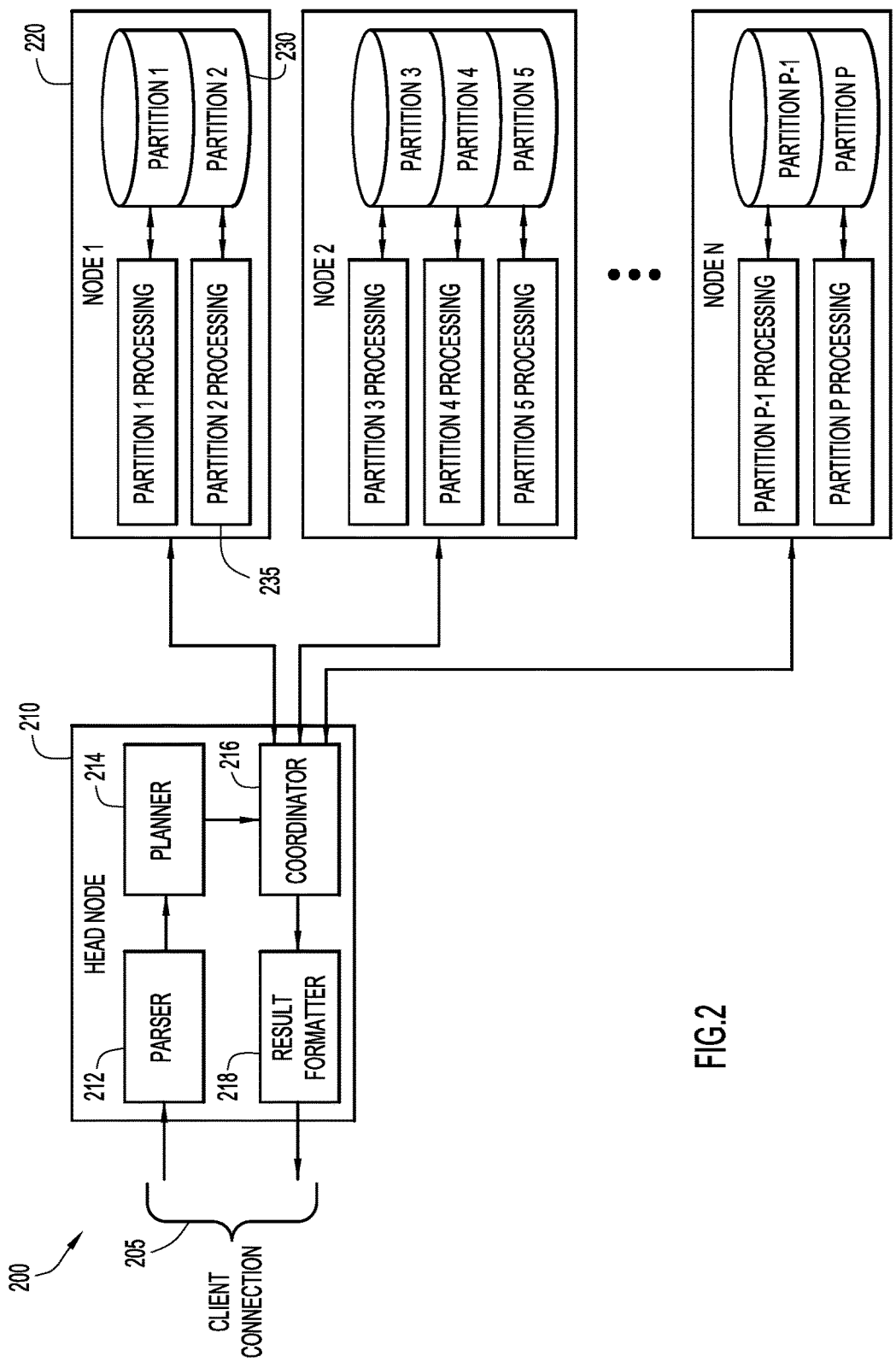
FIG. 2 is a schematic block diagram of a distributed database system for an embodiment of the present invention.

FIG. 2 depicts an exemplary distributed database (DDB) 200 suitably constructed or otherwise configured for practicing the techniques described herein. DDB 200 may be realized on processing resources, e.g., processors 24, and storage resources, e.g., data storage 26, of MPP 20. Node processors 22 may be configured as a head node 210 and as N node processors 220 containing P database partitions 230. As illustrated in FIG. 2, each node processor 220 may have an arbitrary number of database partitions 230 resident thereon and each database partition 230 may have a corresponding partition processing module 235 associated therewith. Each partitioning processing module 235 may perform various database operations on its corresponding partition 230 as well as performing database operations in parallel with other partition processing modules 235 to complete a common task on DDB 200.

Head node 210 provides access to and front-end processing for DDB 200. It is to be understood that any of node processors 22 can be designated as head node 210 and, while such is not illustrated in FIG. 2, head node 210 may also implement one or more partitions of DDB 200. Query jobs and query results may be conveyed through a client connection 205 suitably constructed or otherwise configured in network 12.

Head node 210 may include a parser 212 by which textual database commands and query statements are, among other things, formatted and/or converted from a pseudo-natural language, e.g., structured query language (SQL), to an internal language more suited to machine execution. A planner 214 may be implemented in head node 210 to identify one or more ordered-sequences and/or parallel operations that will carry out the database commands or query. In certain embodiments, planner 214 may include an optimization process by which an optimal query plan is selected. Coordinator 216 may be constructed or otherwise configured to execute the query plan as, for example, coordinated and co-executing threads on partition processing modules 235. Coordinator 216 may distribute the query or command task among processing nodes 220 in accordance with the manner in which data are distributed in DDB 200, and may subsequently collect the result from each thread as processing at each processing node 220 completes. The results may then be assembled by coordinator 216 and suitably formatted for output by result formatter 218. Those having skill in distributed databases will recognize and appreciate various techniques by which the functional components illustrated in FIG. 2 may be realized. The scope of the present invention is intended to embrace all such various techniques.

Figure 3:
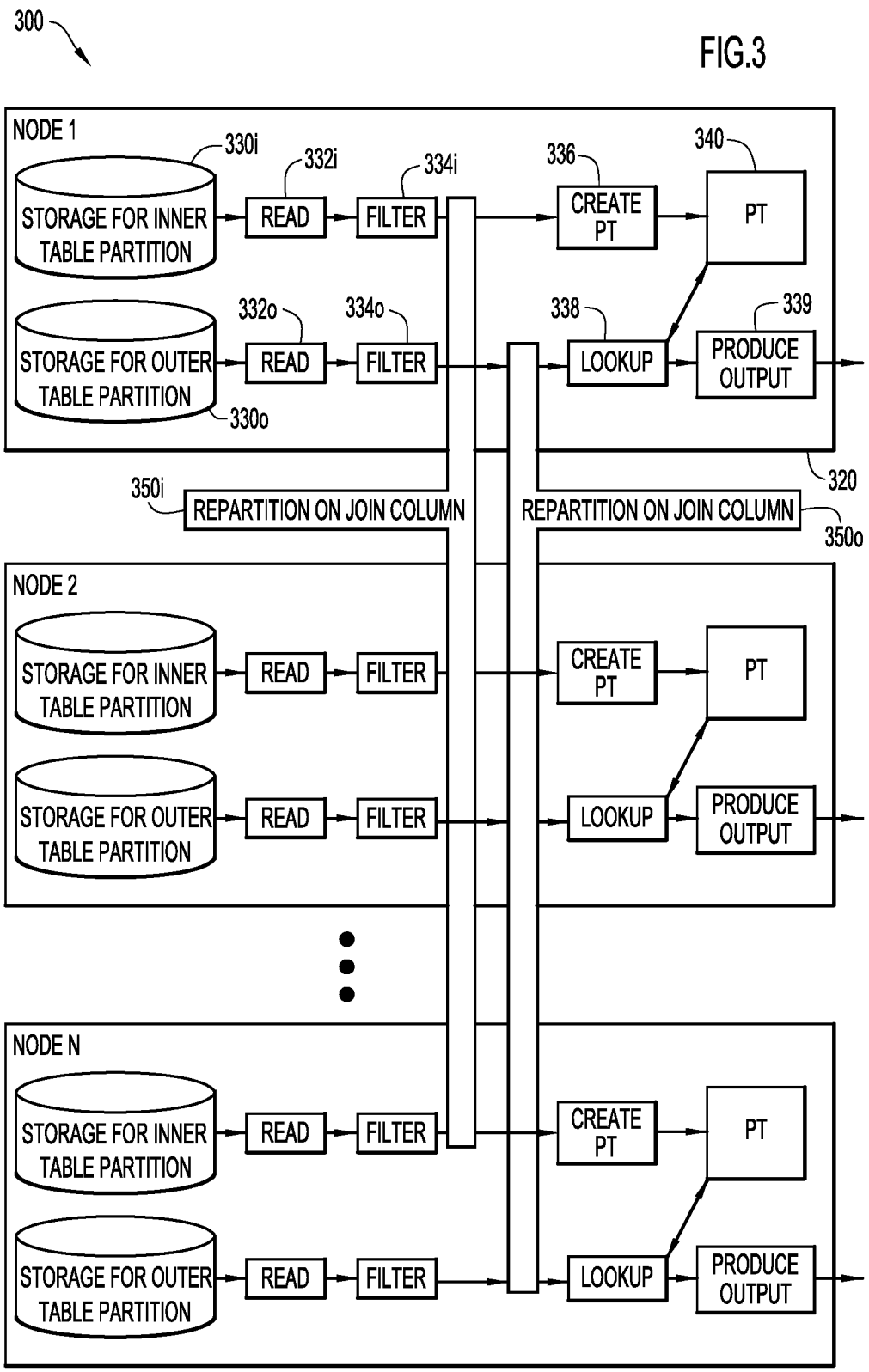
FIG. 3 is a schematic process flow diagram illustrating a JOIN operation on a distributed database for an embodiment of the present invention.

FIG. 3 is a schematic process flow diagram of a JOIN process in a DDB 300, which may be realized in a manner similar to DDB 200. The JOIN process is achieved through parallel processes executed on processing nodes 320 on data resident on the respective nodes. Embodiments of the invention may repartition the database objects (e.g., tables) being joined per, for example, an optimized query plan formulated by planner 214 and distributed to nodes 320 by coordinator 216. For purposes of explanation and not limitation, it is to be assumed that processing nodes 320 operate on single partitions respectively stored thereat.

As illustrated in FIG. 3, the objects being joined are in the form of tables distributed across nodes 320: rows of an inner table are stored in respective partition storage spaces 330*i* and rows of an outer table are stored in respective partition storage spaces 330*o*. In accordance with the query plan, rows of the inner and outer table are retrieved by respective read operations 332*i* and 332*o*, and filtered by respective filtering operations 334*i* and 334*o* to exclude non-relevant rows from the JOIN process. The relevant table rows may undergo respective repartitioning operations 350*i* and 350*o* that rearranges the table rows across the partitions of DDB 300 so that parallel JOIN operations on the applicable columns across processing nodes 320 are accomplished efficiently. An example repartitioning process that can be utilized in repartitioning operations 350*i* and 350*o* is described below.

In operation 336, a partition table (PT) 340 is created from the repartitioned inner table, as described in more detail below. PT 340 is accessed by lookup operation 338 by which a row of the inner table resident on the node processor 320 is located for purposes of joining with the applicable row of the resident outer table. The JOIN operation may be performed by an output producing operation 339.

It is to be understood that PT 340 may be implemented as a hash table or as a direct lookup associative array, commonly referred to as a lookup table (LUT). Accordingly, lookup operation 338 acquires data (e.g., a reference to a row of a table being joined on a particular column) by hash probing, in the case where PT 340 is a hash table, or by indexed lookup, in the case where PT 340 is a LUT.

Figure 4:
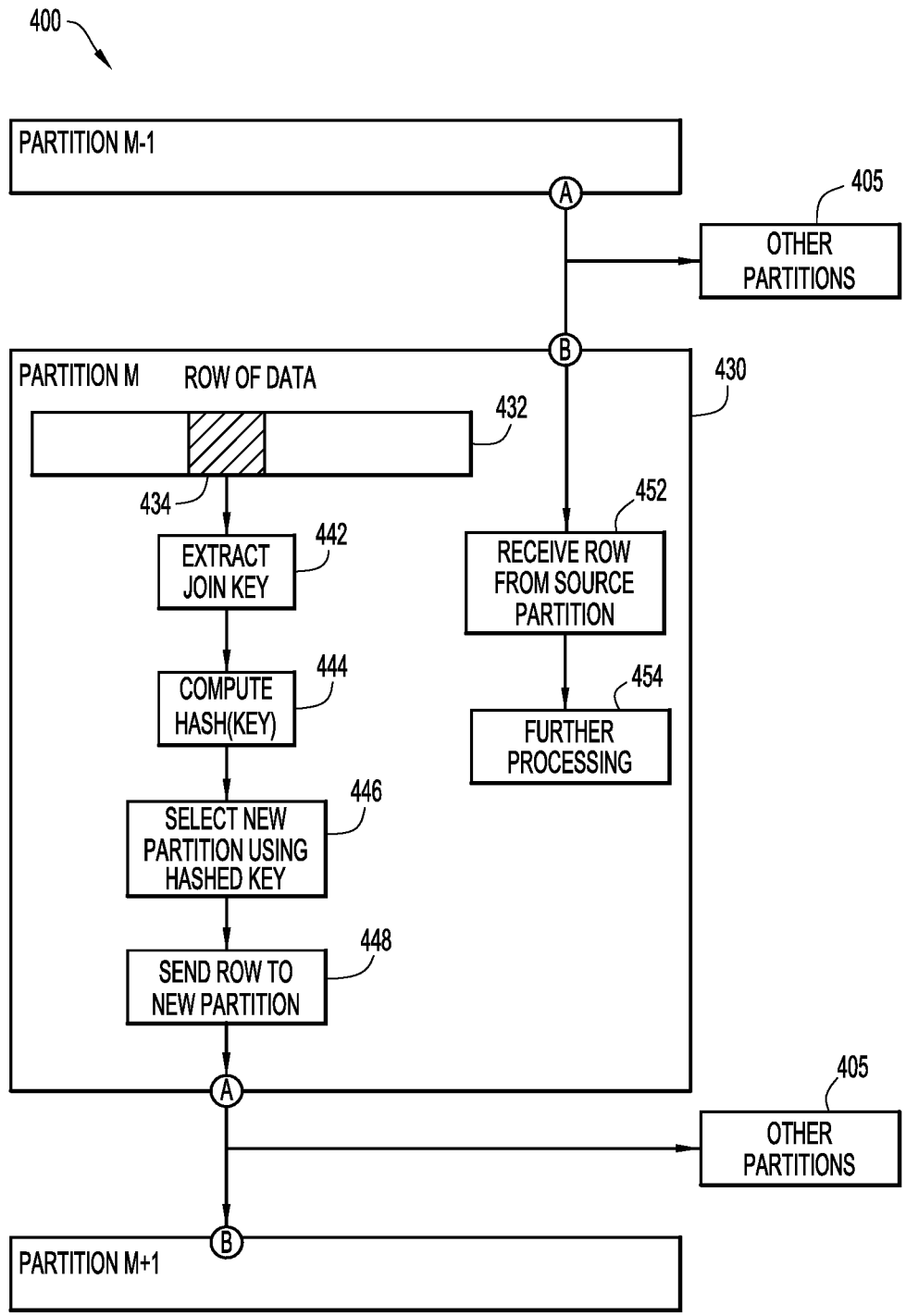
FIG. 4 is a schematic process flow diagram illustrating a repartitioning process utilized in embodiments of the present invention.

FIG. 4 is a schematic process flow diagram of an exemplary repartitioning process 400 that may be used in, for example, repartitioning operations 350*i* and 350*o* in FIG. 3. As stated above, it is to be assumed that each partition 430 resides on respective processing nodes, e.g., processing nodes 320 illustrated in FIG. 3.

In operation 442, a join key is extracted from a join column 434 of a table row 432. In operation 444, the extracted key is hashed by a predetermined hash function, such as K MOD N, where K is the extracted key and N is the number of partitions. In operation 446, a new partition is selected for row 432 based on the hashed key. Row 432 is sent to the new partition, as needed, in operation 448. Meanwhile, rows 432 that have been similarly processed at other processing nodes 320 are received in operation 452 and, in operation 454, the data in the received row is processed, e.g., creating PT 340 and performing the JOIN operation.

In certain embodiments, PTs 340 are constructed to afford maximal efficiency in the JOIN operation (or other database operations). Dense PTs assist in achieving such efficiency and dense LUTs are typically more efficient than hash tables. Embodiments of the invention may determine whether an associative array can be built that would provide greater efficiency than a hash table on the same data.

Figure 5:
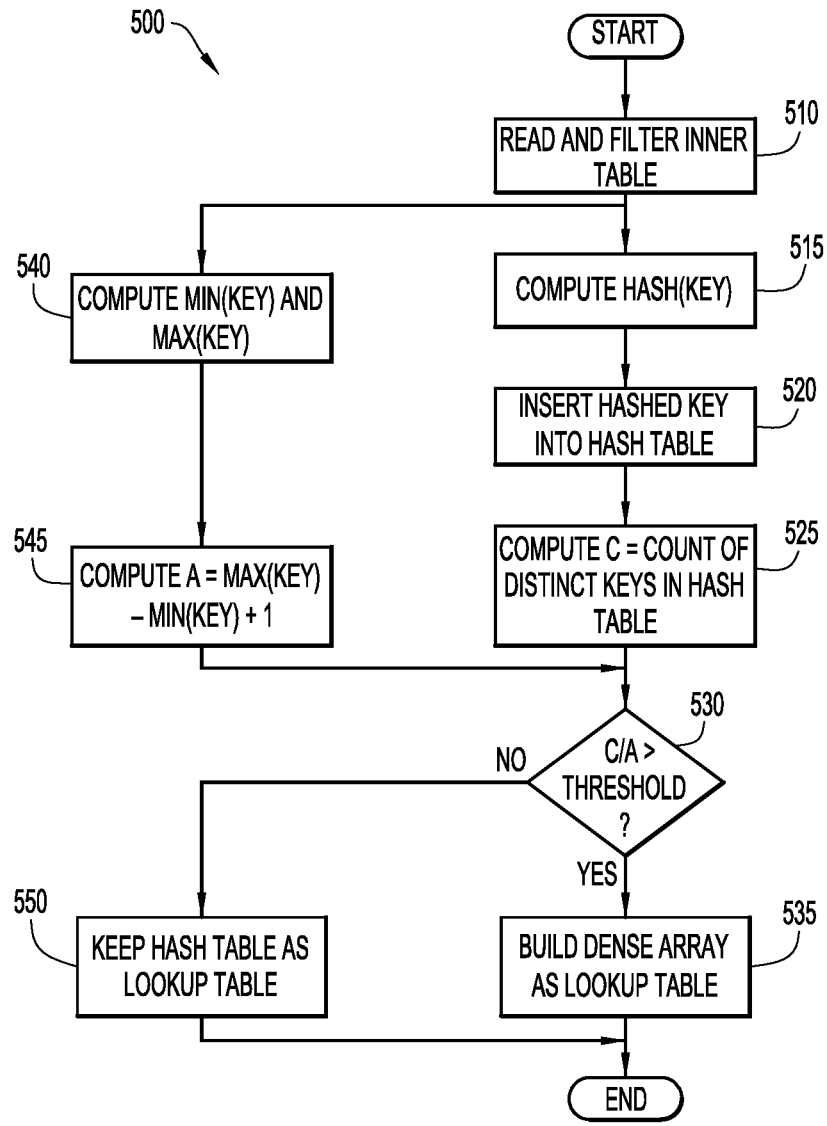
FIG. 5 is a flow diagram of a table efficiency determination process utilized in embodiments of the present invention.

FIG. 5 is a flow diagram of a table efficiency determination process 500 that can be utilized in embodiments of the present invention. In operation 510, the inner table of the JOIN operation is read and filtered, such as by operations 332 and 334 described with regard to FIG. 3. In operation 515, the join key is hashed by a predetermined hash function and, in operation 520 the hashed key is inserted into a hash table. Once the hash table is complete, cumulatively while inserting values into the hash table, a value C is computed as a count of distinct keys contained in the hash table. Meanwhile, in operation 540, the minimum and maximum key values are determined and, in operation 545, a value A is computed from the equation A=max(key)−min(key)+1. In operation 530, a density criterion, e.g., the ratio C/A, is computed and compared with a predetermined threshold. If the density criterion is greater than the threshold, process 500 transition to operation 535, by which a LUT is built and used as PT 340. If, however, the density criterion is not greater than the threshold, as determined in operation 530, the hash table is retained and used as PT 340 for the partition.

The density threshold may be selected to avoid storing a LUT in which numerous unoccupied storage locations exist between relevant lookup sites, which wastes memory space. This memory occupancy density is less of an issue when the total size of the LUT is small. Therefore, in certain embodiments, the occupancy criteria evaluated in operation 530 is whether either C/A is greater than a threshold OR A is smaller than a second threshold. For example, the occupancy criteria may be C/A is greater than 0.5 OR A is smaller than 1,000,000.

FIG. 6 depicts an indexing scheme 600 for a LUT that can be utilized in simple partitioning embodiments of the present invention. In certain embodiments, the join key values K are hashed through a modulus operation based on the number of nodes (or partitions) N: H=K MOD N. The example in FIG. 6 assumes the number of nodes is three (3) although such is merely for providing a simple example. The join keys K may be logically arranged in sections 610 and associated in each section with a corresponding hash value H=K MOD N. Each section 610 may be associated with an index computed by, for example, integer division: I=FLOOR[K/N]. In certain embodiments of the invention, each value H identifies a target partition for the row associated with the join key K. It is to be noted that the hashing function and the index are complementary; the modulus function results in some of the bits of K being used, whereas the integer division results in remaining bits of K being used. Together, the two values H and I contain enough information to reconstruct the original join key value K. Therefore, within any partition (i.e. holding H constant), the value assigned to I establishes that assigned to K. One consequence of this is that the likelihood of hash collisions is reduced.

Figure 7:
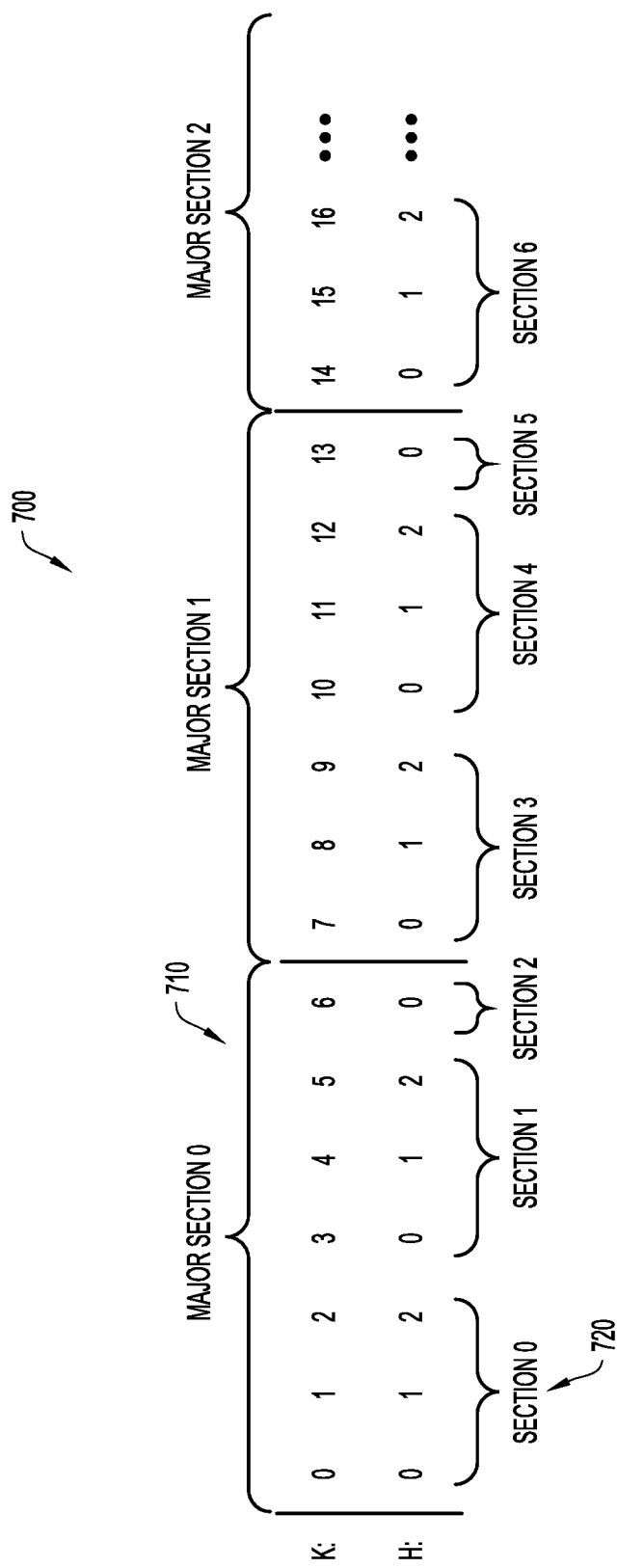
FIG. 7 is a diagram illustrating data indexing utilized in two-stage partitioning embodiments of the present invention.

FIG. 7 depicts another indexing scheme 700 for a LUT that can be utilized in two-stage partitioning embodiments of the present invention. The LUT for scheme 700 is also logically arranged in sections; although it is arranged into major sections 710 as well. As before, within each section 720, each K has a unique value H, which corresponds to a particular partition. Hash value H may be determined through a modulus operation: H=(K MOD P) MOD N, where K is the join key value, N is the number of processing nodes and P is a previously selected large prime number. In the example of FIG. 7, N=3 and P=7. The sections 720 may again be identified by an index I, which can be computed by, for example, I=FLOOR(K/P)*S+FLOOR((K mod P)/N). Here, FLOOR(K/P) is a major section number and FLOOR ((K mod P)/N) is a section number within a major section 710 (i.e., a local section number). S is a scale factor and is chosen to exceed all local section numbers; the smallest value of S that achieves this constraint simultaneously for all partitions is S=1+FLOOR((P−1)/N). In certain embodiments, the scale factor may be simplified to S=1+FLOOR (P/N).

In certain embodiments, some LUTs may be optimized to produce denser structures. For example, each partition could be assigned its own value for scale factor S. In the scheme illustrated in FIG. 7, for example, partition 0 requires S=3, but partitions 1 and 2 can use S=2 (since they have only two sections per major section). That is, referring first to the partitions in major section 0, three values of K are mapped to partition 0: K=0, K=3, and K=6; there are two values of K mapped to partition 1: K=1 and K=4; and there are two values of K mapped to partition 2: K=2 and K=5. If a scale factor of S=3 is used, then the LUT for partition 0 uses indices 0, 1, and 2 for K values 0, 3, and 6; indices 3, 4, 5 for K values 7, 10, 13, and so on, i.e. the LUT is constructed without gaps. The LUT for partition 1 uses indices 0 and 1 for K values 1 and 4, indices 3 and 4 for K values 8 and 11, and so on—with a gap at index 2. However, if, instead, a scale factor S=2 is used for partition 1, then the indices are 0 and 1, 2 and 3, etc., i.e., without a gap. If H indicates the partition number, such that 0≤H≤N, then the scale factor could be established for each partition by: S[H]=FLOOR ((P−1−H)/N)+1. This would produce denser lookup arrays on some partitions, in particular if the keys K form a perfectly dense array, in which case the indices I will form perfectly dense arrays of every partition.

It will be appreciated that the embodiments described above and illustrated in the drawings represent only a few of the many ways of implementing embodiments for creating dense lookup arrays for partitioned JOINs.

The environment of the present invention embodiments may include any number of computer or other processing systems (e.g., client or end-user systems 14, server systems 10, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, partition processing modules, etc.). These systems may include any types of monitors and input devices (e.g., keyboard, mouse, voice recognition, etc.) to enter and/or view information.

It is to be understood that the software (e.g., parser 212, planner 214, coordinator 216, result formatter 218, partition processing modules 235, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., e.g., parser 212, planner 214, coordinator 216, result formatter 218, partition processing modules 235, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The present invention embodiments may employ any number of any type of user interface (e.g., Graphical User Interface (GUI), command-line, prompt, etc.) for obtaining or providing information (e.g., database commands, query statements, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The formatted results from result formatter 218 may include any information arranged in any fashion, and may be configurable based on rules or other criteria to provide desired information to a user (e.g., JOIN results, errors, etc.).

The present invention embodiments are not limited to the specific tasks or algorithms described above, but may be utilized for other distributed database operations that combine objects in different partitions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of performing a join operation on a plurality of database objects comprising:

distributing data structures contained in a first database object across a plurality of database partitions in accordance with a partitioning scheme, the database partitions being stored in respective data storage units of a plurality of processing nodes, each of the processing nodes comprising a processor and a data storage unit, the processing nodes being communicatively coupled one to another, wherein each of the plurality of database partitions uniquely corresponds to a partition processing module configured to perform one or more operations on the corresponding database partition in parallel with one or more other partition processing modules to complete a common task on the first database object;

associating the data structures of the first database object with indices computed complementary to the partitioning scheme;

computing other indices from data structures contained in a second database object; and performing the join operation at each of the database partitions on the data structures in the respective first and second database objects having the indices and the other indices in common.

2. The method of claim 1, further comprising:

performing, as the partitioning scheme, a hash function on key values identifying data in the respective first and second database objects on which the join operation is predicated; and distributing the first and second database objects across the database partitions in accordance with the hashed key values.

3. The method of claim 2, further comprising:

determining whether data values in the data structure of the first database object meet a density criterion.

4. The method of claim 3, further comprising:

constructing a memory array that associates each of the data structures of the first database object with the respective indices in response to the data values meeting the density criterion.

5. The method of claim 3, further comprising:

constructing a hash table that associates the hashed key values with the data structures in response to the data values failing to meet the density criterion.

6. The method of claim 1, further comprising:

distributing the data structures in the first and second database objects in accordance with a modulus operation K MOD N, where K is the key value and N is the number of partitions over which the data structures are distributed; and computing the index and the other index in accordance with an integer division operation K/N.

7. The method of claim 1, further comprising:

distributing the data structures in the first and second database objects in accordance with a modulus operation (K MOD P) MOD N, where K is the key value, N is the number of partitions over which the data structures are distributed and P is a predetermined prime number; and computing the index and the other index in accordance with an integer division operation $((K/P)*S)+((K \text{ MOD } P)/N)$, where S is a scale factor.

8. The method of claim 7, wherein the scale factor, S, is determined at each partition from one of:

$S \geq 1+((P-1)/N)$; and $S \geq 1+(P/N)$;

wherein P is the prime number, and N is the quantity of partitions.

* * * * *